Figure 1:
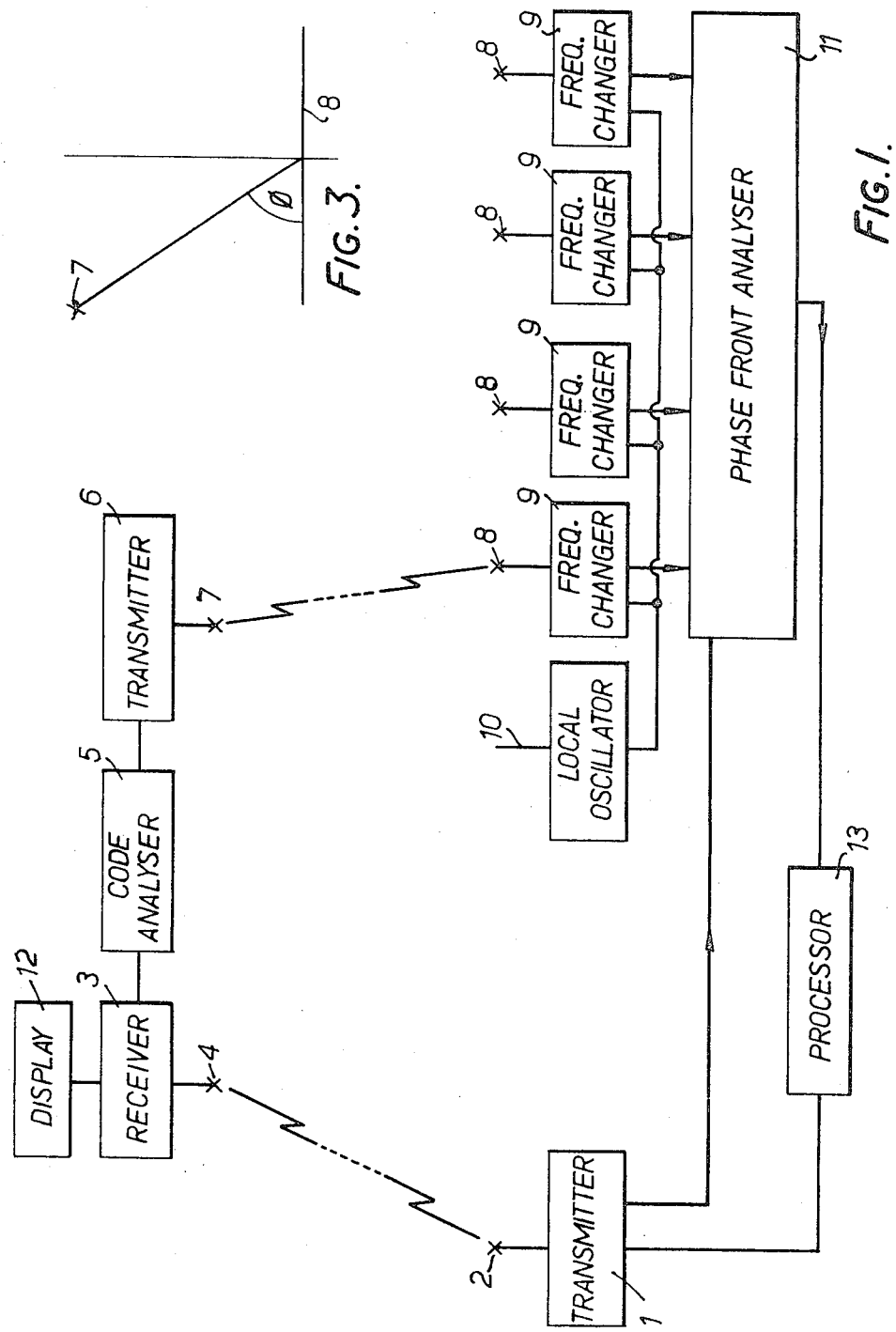

United States Patent [19]
Blakemore

[11] 3,852,753
[45] Dec. 3, 1974

[54] POSITION LOCATING ARRANGEMENTS
[75] Inventor: Thomas Raymond Blakemore, Chelmsford, England
[73] Assignee: The Marconi Company, Limited, Chelmsford, Essex, England
[22] Filed: Oct. 6, 1972
[21] Appl. No.: 295,712

[30] Foreign Application Priority Data
Oct. 8, 1971  Great Britain .................... 46994/71

[52] U.S. Cl. ...................... 343/113 R, 343/113 DE
[51] Int. Cl. ............................................. G01s 5/02
[58] Field of Search ..... 343/108 M, 113 R, 113 DE, 343/120, 100 SA

[56] References Cited
UNITED STATES PATENTS
2,992,384  7/1961  Malbrain .......................... 324/78 D
3,370,267  2/1968  Barry .............................. 343/113 R
3,449,711  6/1969  Ricketts et al. ................. 343/113 R
3,657,693  4/1972  Graham et al. ............... 343/113 DE
3,691,514  9/1972  Goursolas ...................... 343/113 R
3,716,853  2/1973  Follette .......................... 343/113 R
3,774,212  11/1973  Eckert et al. .................. 343/108 M Primary Examiner—Maynard R. Wilbur
Assistant Examiner—T. M. Blum
Attorney, Agent, or Firm—Baldwin, Wight & Brown

[57] ABSTRACT

An arrangement is described for determining the position of a source or virtual source of radio frequency radiations in which signals received from the source by each aerial of an array of aerials and derived from the same wave packet of radiation are separated in time to provide an information signal whose frequency or cyclic content during the information signal time period indicates the bearing of the incident wave packet.

5 Claims, 6 Drawing Figures

POSITION LOCATING ARRANGEMENTS

This invention relates to position locating arrangements, and more particularly to position locating arrangements provided to locate the position of a source, or a virtual source, of radio frequency radiation.

As is known, aerial arrays used in such position locating arrangements may consist of a required number of elemental aerials or they may consist of a lesser number of elemental aerials which are so interconnected as to synthesise the actual required number of elemental aerials. The terms "array of aerials" and "aerials" as used in this specification is understood to include such synthesised arrays and aerials.

One known type of position locating arrangement includes an array of aerials, positioned to receive radiation emanating from the source, whose position is to be located. The position of the source is determined by measuring the relative phases of the signals received by each of the aerials in the array. In known arrangements the signals received by the aerials of the array are switched sequentially to a signal processor, so that the phase information is derived from sequential portions of the waveform received by the aerial array.

In order to obtain accurate results with such an arrangement it is essential that the waveform received by the aerial array be coherent for at least the period of time during which the sequential portions of the waveform, from which the phase information is derived, are being received by the aerial array. Consequently the signal generator producing the waveform must be a coherent signal generator. Such generators are expensive, and the necessity for such oscillators is a disadvantage.

The present invention seeks to provide an improved position locating arrangement in which the above disadvantage is reduced.

According to the broadest aspect of this invention a position locating arrangement, of the type in which the position of a source, or virtual source, of radio frequency radiation is determined from signals received from said source, or virtual source, by an array of aerials, is adapted to sample the signals received by each of the aerials, the samples being the signals received by each of the aerials during one predetermined scan period of time.

In one embodiment of the invention signals derived from the signals received by each aerial are fed through a modulator to a separate input to a delay device, the arrangement being such that, in operation, all of the modulators are rendered conductive for a predetermined period of time simultaneously, the delay imparted by the delay device being such that the output of the delay device comprises an information signal constituted by the signals passed by the modulators while conductive arranged sequentially.

Preferably said delay device is a delay line.

Preferably said delay line is provided with a plurality of inputs spaced along its length, the spacing being such that the delay imparted by the section of line between two adjacent inputs is not less than said predetermined scan period of time.

In an alternative embodiment of the invention signals derived from the signals received by each aerial are fed through a separate delay device to a separate modulator, the delay devices each imparting a different delay, the arrangement being such that, in operation, each of the modulators is rendered conductive in turn for a predetermined period of time to provide an information signal derived from the signals received by each of the aerials during a certain predetermined period of time.

Preferably said signals derived from the signals received by each aerial are produced by heterodyning the signals received by each aerial with signals produced by a local oscillator, additively mixing the heterodyned signals received by one aerial with a reference frequency, and subtractively mixing the resultant signal with the heterodyned signals received by each of the aerials.

Preferably means are provided for determining the frequency of said information signal. The frequency of said information signal may be determined by a zero-crossing counter and a device measuring the time between the first and last zero crossings of the signal. Alternatively the signal may be fed to a bank of band pass filters having their bands centred on differing frequencies.

Means may be provided for off-setting each predetermined scan period of time in a number of sequential scan periods of time such that a beat of one cycle is obtained over the period of time occupied by that number of sequential scan periods of time.

Figure 2:
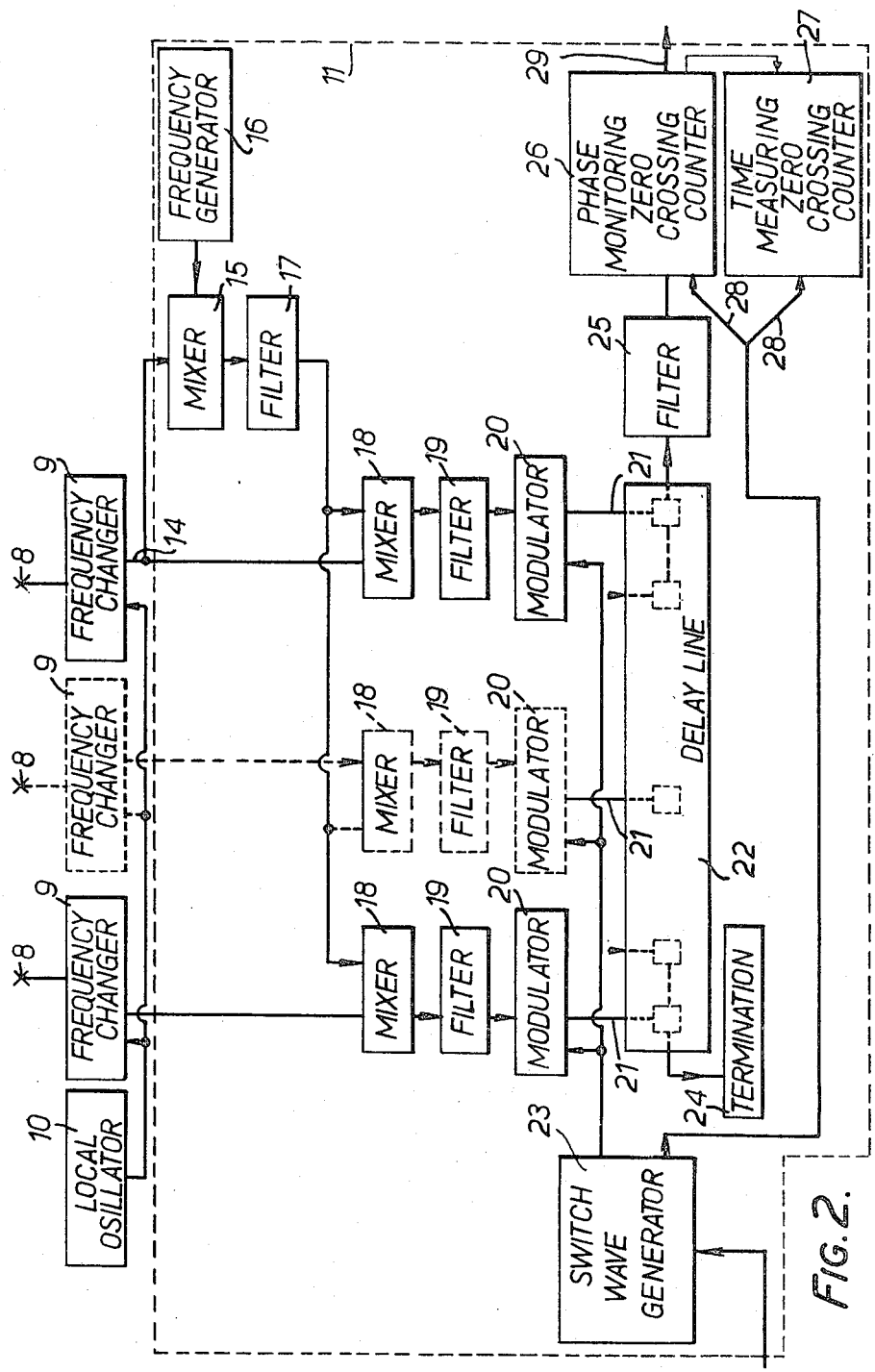
Figure 4:
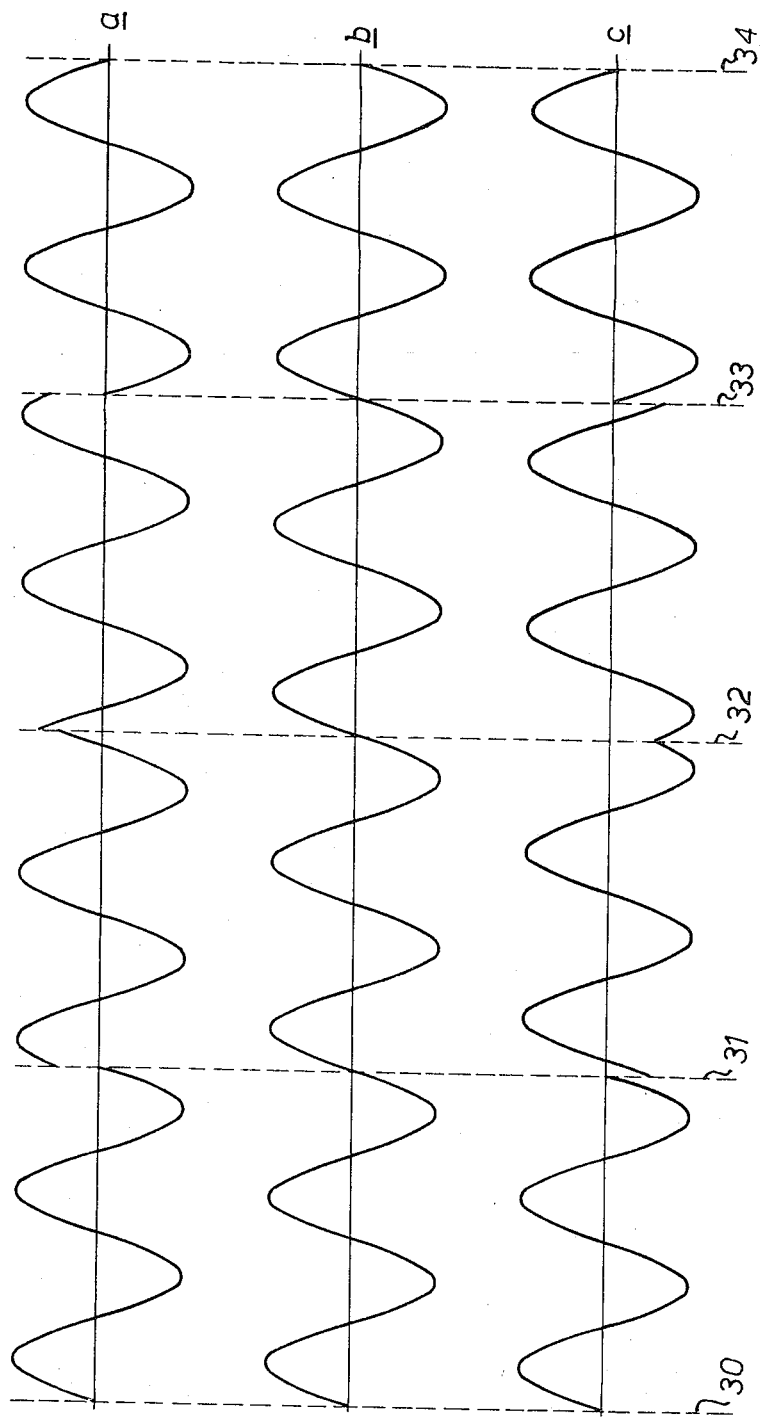
Figure 5:
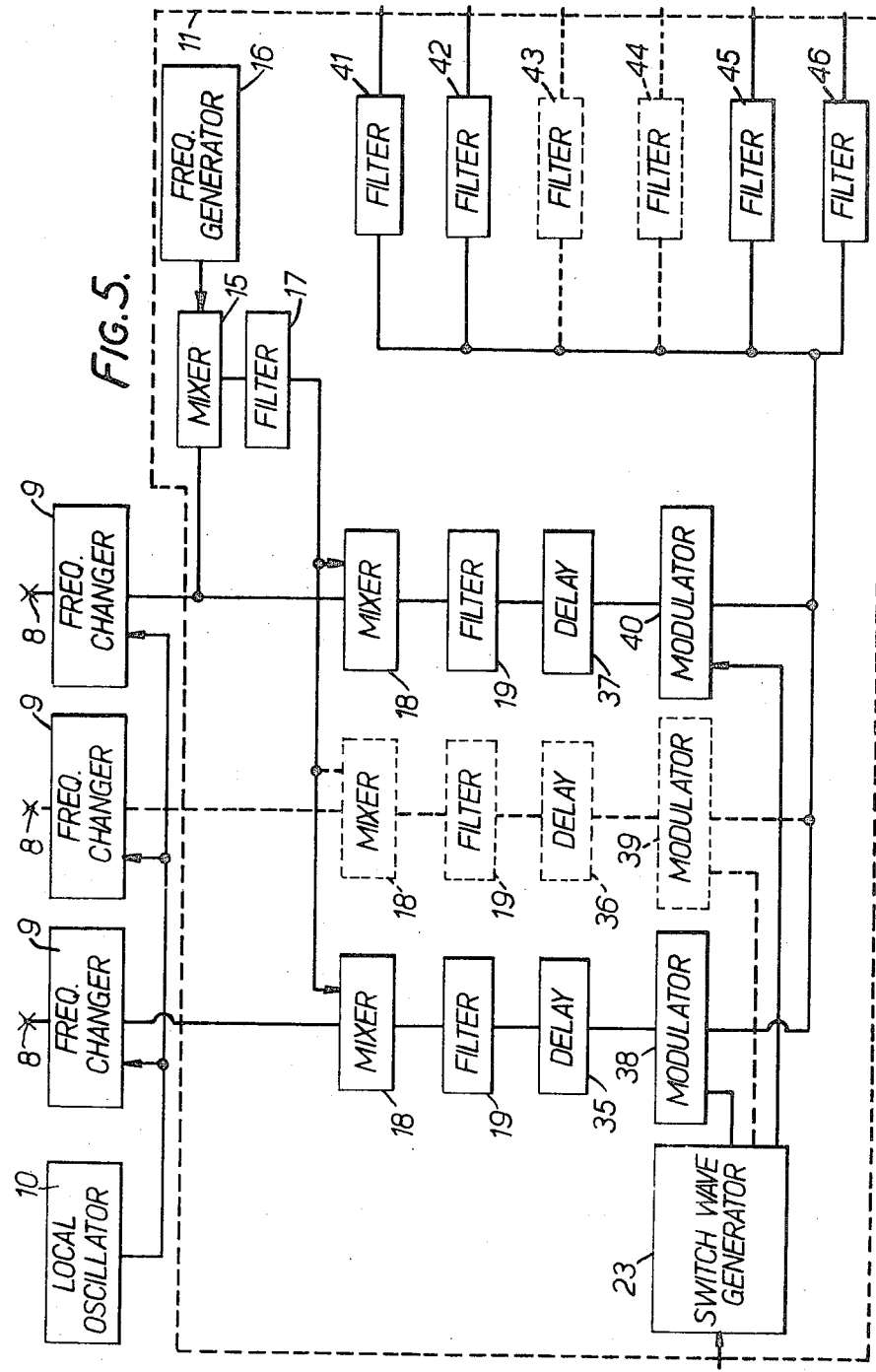
Figure 6:
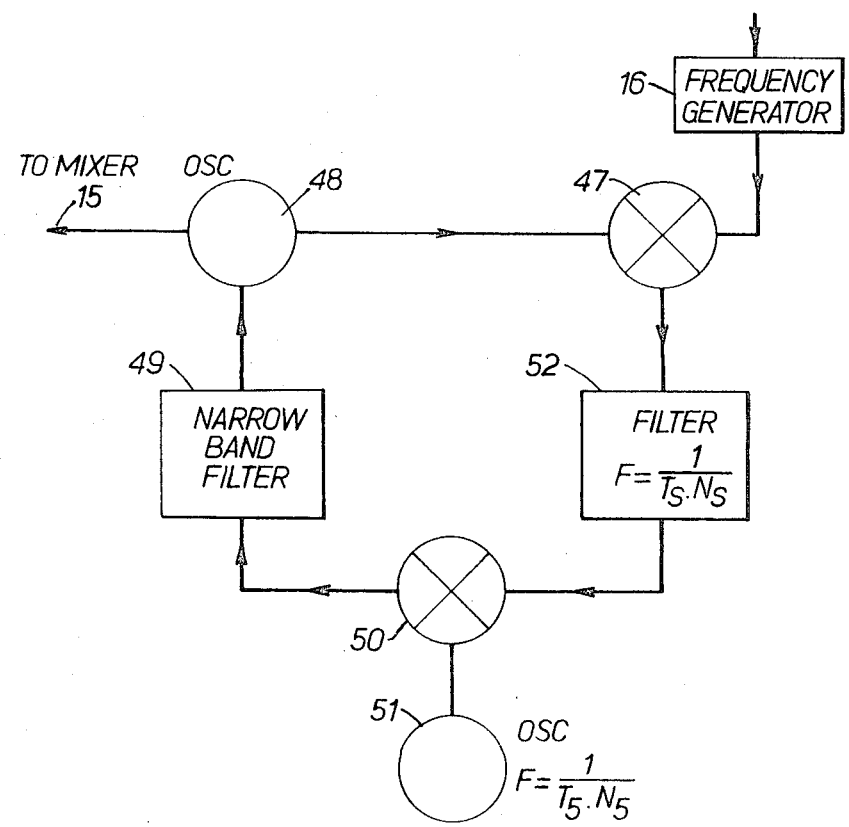

The invention will now be described, by way of example, with reference to the accompanying drawings in which, FIG. 1 is a schematic block diagram of a position locating arrangement incorporating the invention, FIG. 2 is a more detailed block diagram of part of the arrangement illustrated in FIG. 1, FIG. 3 is a diagrammatic figure showing the positions of various integers of a position locating arrangement incorporating the invention when in use, FIG. 4 is a diagrammatic representation of explanatory waveforms, FIG. 5 is a detailed block diagram of an alternative embodiment of the part of the arrangement illustrated in FIG. 2, and FIG. 6 illustrates a modification which may be applied to the arrangement shown in FIG. 2.

Referring to FIG. 1 a position locating arrangement is illustrated in block diagrammatic form. A radio transmitter 1, with its aerial 2, is provided at a fixed ground location. A radio receiver 3, having an aerial 4, a display device 12, a code analyser 5 and a further radio transmitter 6, having an aerial 7 are carried by an aeroplane whose position is to be located. An array of receiving aerials 8 is positioned at the same location as the transmitter 1, and the output of each of the aerials 8 is connected to an individual frequency changer unit 9. A local oscillator 10 is also connected to each frequency changer unit 9. The outputs of the frequency changer unit are each fed to a phase-front analyser, which is represented by box 11. The phase-front analyser will be illustrated and described in detail later. The output of the phase-front analyser 11 is fed to a processor unit 13, the output of which is fed to the transmitter 1.

When the aircraft approaches the location of the transmitter 1, and if the pilot wishes to be informed of his position relative to the array of aerials 8, the equipment carried by the aircraft is energised. The transmitter 1 transmits coded signals through the aerial 2, and these coded signals are received by the aerial 4 mounted on the aircraft, and are fed to the receiver 3. The output of the receiver 3 is fed to a code analyser 5, which analyses the signals received, until a coded signal individual to that particular aircraft is received. The code analyser is adapted to "recognise" this particular coded signal, and when this signal is received the code analyser activates the transmitter 6, which then transmits a C.W. signal through the aerial 7 for a predetermined period of time.

The C.W. signal transmitted by the transmitter 6 is received by the aerials 8 of the aerial array located on the ground. The phases of the C.W. received by the various aerials 8 will be dependent upon the direction in which the wave fronts of the C.W. approach the aerial array, and thus upon the direction of the aircraft relative to the axis of the array. The signals received by each aerial are fed to a separate one of the frequency changers 9, which are each fed with signals from the local oscillator 10. The outputs of the frequency changers 9 are each fed to a phase front analyser 11, which analyses the signals so as to produce a signal representative of the direction of the aircraft relative to the axis of the aerial array 8. This signal is then processed, to derive the position of the aircraft, and the requisite information is transmitted by the transmitter 1 to the receiver 3 for subsequent display on the display device 12.

Only one array of aerials 8 has been shown, for reasons of clarity, but in practice two such arrays would be used, with one positioned to determine the direction of the aircraft in azimuth, and the other positioned to determine the direction of the aircraft in elevation. A ranging device may also be provided to determine the range of the aircraft by measuring the time delay between the transmission of the coded signal by the transmitter 1 and the reception of a signal transmitted by the transmitter 6 at the aerial array 8. Such ranging devices are well known, and as the provision of such a ranging device forms no part of the actual invention, no ranging device has been illustrated. The processor 13, and the display device 12, may take many possible forms. These forms are well known to persons skilled in the art, and as they again form no part of the actual invention they are not illustrated or described in great detail.

It will be clear that while the system is particularly described with reference to an aeroplane, with the transmitter 1 being located on the ground, the transmitter 6 and the associated equipment could be mounted on a helicopter, a rocket, a ship, a vehicle, or any other movable object whose position is to be determined. Similarly the transmitter 1 and its associated equipment can be mounted, for example, on an aircraft carrier, on an aircraft adapted to "hunt" other aircraft, or in many other possible locations.

Again it will be clear that while the signals derived from the processor have been described as being transmitted by the transmitter 1 through the receiver 3 to the display device 12 it would be possible to feed these signals to a display device positioned at the same location as the processor. Alternatively the signals could be used directly to control auxiliary equipment.

Referring to FIG. 2 a portion of the arrangement of FIG. 1 is shown in greater detail. FIG. 2 shows three aerials 8 of the aerial array each connected to an individual frequency changer 9. In practice there would be many aerials 8 each associated with a frequency changer unit 9 — typically a hundred (or a synthesised effective one hundred) — but only three have been shown for reasons of clarity. It is to be understood that in the arrangement to be described parts that are shown connected to the frequency changers 9 illustrated will have counter-parts — not illustrated — that are connected to the unillustrated frequency changers 9. Each of the frequency changers 9 is connected to the local oscillator 10, and the output of each of the frequency changers 9 is fed to the phase front analsyer 11.

The input 14 to the phase front analyser 11 derived from the aerial 8 situated at one end of the aerial array is fed to a mixer unit 15, which is also supplied with oscillations from a reference frequency generator 16. The output of the mixer 15 is fed to an upper side band filter 17. Each of the inputs to the phase front analyser 11 derived from the frequency changers 9 is fed to an individual mixer 18, which is also connected to the output of the upper side band filter 17. The output of each mixer 18 is fed to a lower side band filter 19 through a modulator 20 to an input 21 of a delay line 22. Each modulator 20, which may be constituted by a Silicon Controlled Rectifier or a PIN diode, for example, is connected to, and controlled by, a switching waveform generator 23, which in turn is connected to, and controlled by, the transmitter 1 (shown in FIG. 1).

One end of the delay line 22 is provided with a suitable termination 24, and the other end is connected, through a filter 25, to an input of a phase monitoring zero-crossing counter 26. The phase monitoring zero-crossing counter 26 is connected to a time measuring zero-crossing counter 27 and both the phase monitoring zero-crossing counter 26 and the time measuring zero-crossing counter 27 are provided with an input lead 28 which is connected to the switching waveform generator 23. The phase monitoring zero-crossing counter has an output 29, which is the outupt of the phase front analyser 11.

FIG. 3 shows the positions of the aerial array 8 and the aerial 7 of the transmitter 6 in a typical operational situation in which the direction of the aerial 7 relative to the axis of the aerial array 8 is indicated by the bearing $\phi$. This situation will be considered during the description of the operation of the embodiment illustrated in FIG. 2.

In operation of the arrangement illustrated in FIG. 2 a wave front of the wave transmitted by the transmitter 6 will approach the aerial array 8, and the wave front will be at an angle to the aerial array. As a result of this the signals present on the aerials 8 of the aerial array each receive a signal that is of the same frequency but which is, at any particular instant, of slightly different phase from the signal received by the aerials adjacent to the aerial in question.

Let us assume that:

$f_1$ is the frequency of the signal transmitted by transmitter 6

$\Delta f_1$ is the doppler frequency imparted on the signal transmitted by the transmitter 6 due to its motion relative to the aerial array 8

$\lambda$ is the wavelength of signals of frequency $f_1$ $d$ is the spacing between adjacent aerials 8

$n$ is the number of any aerial counted as from the right hand side of the array, as illustrated, assuming that the extreme right hand aerial has the number 0.

$\alpha$ is the phase of the signal received by the aerial $n = 0$.

The signal received by the aerial $n = 0$ will have the frequency $f_1 + \Delta f_1$ and the phase $\alpha$. The signal received by each of the other aerials will also have the frequency $f_1 + \Delta f_1$, but each will have the phase $\alpha - n\, 2\pi/\lambda d \cos \phi$, and thus the phase of the signal received by any aerial will be different from the phase of the signal received by the adjacent aerials unless $\cos \phi = 0$.

The signals received by the aerials will be of high frequency, and in order to reduce the frequency of the signals to a more convenient level each signal is fed to a frequency changer 9, where it is mixed with signals having a frequency of $f_o$ from a local oscillator 10. The resultant signal from the frequency changer 9 associated with the aerial 8 where $n = 0$ has the frequency $(f_1 + \alpha f_1) - f_o$ and the phase $\alpha$, and similarly the signals from the other frequency changers 9 have the frequency $(f_1 + \alpha f_1) - f_o$ and the phase $\alpha - n\, 2\pi/\lambda d \cos \phi$.

The output 14 of the frequency changer 9 associated with the aerial 8 for which $n = 0$ is fed to a mixer 15, where it is mixed with signals having a frequency $f_r$ which are produced by the reference frequency generator 16. The output of the mixer 15 is a signal in which the frequencies $(f_1 + \Delta f_1) - f_o + f_r$ and $(f_1 + \Delta f_1) - f_o - f_r$ are present. This signal is fed to an upper side band filter 17, and the resultant signal only contains a component having a frequency $(f_1 + \Delta f_1) - f_o + f_r$, which has the phase $\alpha$.

This signal is fed to each of the mixers 18, which are also fed with individual outputs of respective frequency changers 9. The output of each mixer 18 contains frequency components $(f_1 + \Delta f_1 - f_o) + (f_1 + \Delta f_1 - f_o + f_r)$ and $(f_1 + \Delta f_1 - f_o) - (f_1 + \Delta f_1 - f_o + f_r)$, and each output is connected to the input of the lower side band filter 19. The output of the lower side band filter solely contains signals of the frequency $f_r$ and the phase of the signal on the outputs of each of the filters is $-n\, 2\pi/\lambda d \cos \phi$.

The above part of the operation of the device occurs wherever a signal is received by the aerial array 8. However, the next part of the operation of the device occurs only when the switching wave form generator 23 generates the appropriate signals.

The switching wave form generator 23 generates a square wave pulse of predetermined length, and this pulse is fed simultaneously to each of the modulators 20 connected to the lower side band filters 19. This pulse serves to render each of the modulators 20 conductive for the duration of the pulse, and consequently during the pulse, the signals present on the outputs of the lower side band filters 19 are passed through the modulators 20 to the inputs 21 of the delay line 22. The delay line is such that the delay imparted between any two adjacent inputs is equal to (or more than) the duration of the pulse generated by the switching wave form generator. Consequently the signals present on the output of the filter 19 associated with the aerial $n = 0$ during the pulse pass through the delay line 22, and pass into the filter 25. Immediately afterwards the signals present on the output of the filter 19 associated with the aerial $n = 1$ during the pulse pass through the delay line into the filter 25. Similarly the signals present on the outputs of the remaining low pass filters during the pulse appear sequentially at the filter 25 constituting an information signal.

The switching wave form generator generates a second pulse which is N times as long as the original pulse, where N is the total number of aerials 8, and which is timed to commence when the first of the signals from the delay line reaches the phase monitoring zero-crossing counter 26. This second pulse activates the phase monitoring zero-crossing counter 26 and the time measuring zero-crossing counter 27 and these two units serve to count the number of zero-crossings occurring during the second pulse, and to measure the time lapse between the first such zero-crossing and the last such zero-crossing. The time measurement is supplied to the phase monitoring zero-crossing counter 26 which produces an output on the lead 29 which is representative of the frequency of the signal present on the output of the filter 25 during the second pulse. The frequency of this signal, as measured above, is representative of the angle $\phi$.

Referring to FIG. 4 three wave forms a, b and c are illustrated for purposes of explanation. Each wave form is representative of the signal present on the output of the filter 25 under certain conditions, and the portions of the waveforms derived from the various aerials 8 are indicated by the lines 30–34. For reasons of clarity only a few cycles of each signal are shown, and it is to be understood that in practice many more cycles would be present. The wave form a corresponds to the condition where $\phi$ is less than 90°, b corresponds to the condition where $\phi$ is 90°, and c corresponds to the condition where $\phi$ is more than 90°. Each of the wave forms is representative of the signals fed to the delay line 22 by four adjacent modulators 20, the lines 30–34 serving to indicate which signals are derived from which modulator.

Consider the wave form b which represents the condition where $\phi$ is 90°, i.e., where the aerial 7 is in such a position that the wave fronts of the signal transmitted by the transmitter 6 are parallel to the aerial array 8 when they reach that array. Thus all the signals received by the aerials 8 are in phase, and all the signals fed to the delay line 22 by the modulators 20 have the same phase. This is shown in the figure as the portions of the wave form between each adjacent pair of the lines 30–34 are identical. The combination of the signals supplied by the modulators 20 represents the output signal of the delay line 22 and it can be seen that in the particular example given the zero-crossing counter 26 will count sixteen zero-crossings for the portion of the wave form illustrated.

Consider now the wave form a, which is representative of the condition where $\phi$ is less than 90°. The signals received by each aerial 8 will now have a phase different from the phase of the signals received by the aerials adjacent to that aerial. The phase of the signal present on each aerial will be given by the expression $\alpha - n\, 2\pi/\lambda d \cos \phi$, as described above. The phase of the signal present on each of the modulators will be $-n2\pi/\lambda d \cos \phi$ and thus the phase of the signal passed by each modulator will be retarded with respect to that passed by the modulator associated with the aerial having the next lower value of n. Thus if the wave form between the lines 30 and 31 is considered, for example as being passed by the modulator associated with the aerial $n = 49$, and if the wave form between the lines 31 and 32 is passed by the modulator associated with the aerial $n = 48$ it can be seen that the phase of the wave forms passed by the modulators vary. The phase of the wave form between the lines 30 and 31 can be seen to be retarded with respect to the wave form between the lines 31 and 32. The phases of the wave forms between the lines 32, 33 and 34 vary in a similar manner. Again the combination of signals supplied by the modulators 20 represents the output signal of the delay line 22, and it can be seen that, in the example given, the zero-corssing counter 26 will count seventeen zero-crossings for the portion of wave form illustrated.

Lastly consider the wave form c, which is representative of the condition where $\phi$ is more than 90°. Again the signals received by each aerial 8 will have a phase different from the phase of the signals received by the aerials adjacent to that aerial. The phase of the signals present on each aerial is, as before, given by the expression $\alpha - n\, 2\pi/\lambda d \cos \phi$, the signal present on the corresponding modulator having the phase $- n2\pi/\lambda d \cos \phi$. Thus, as $\phi$ is greater than 90°, and as $\cos \phi$ is thus negative, the phase of the signal passed by each modulator will be in advance of the signal passed by the modulator associated with the aerial having the next lower value of n. The phase of the wave form between the lines 30 and 31 can be seen to be in advance of the phase of the wave form between the lines 31 and 32. The phases of the wave forms between the lines 32, 33 and 34 vary in a similar manner. The combination of the signals supplied by the modulators 20 represents the output of the delay line 22, and it can be seen that, in the example illustrated, the zero-crossing counter 26 will count fifteen zero-crossings for the portion of wave form shown in the figure.

It can now be seen that the count recorded by the phase monitoring zero-crossing counter will depend upon the magnitude of the angle $\phi$, and thus this count can be used as a measure of the magnitude of that angle. This count, together with a signal derived from the time measuring zero-crossing counter 27, which measures the time between the first zero-crossing and the last zero-crossing counted by the phase monitoring zero-crossing counter, is fed to the processor 13 of FIG. 1.

Referring to FIG. 5 an alternative embodiment of the part of the arrangement illustrated in FIG. 2 is shown. The parts bearing the reference numerals 9–19 are the same as the corresponding parts shown in FIG. 2, and so no detailed description of these parts will be given here. The output of each of the filters 19 is fed to an individual delay unit 35, 36, 37. Each delay unit imparts a delay to the signal which is one unit of time longer than the delay imparted by the adjacent delay unit on one side, and one unit of time shorter than the delay imparted by the adjacent delay unit on the other side. The output of each of the delay units 35 is fed to a separate modulator 38, 39, 40, each of which is individually controlled by a switching wave form generator 23. The outputs of the modulators 38, 39, 40 are all fed to the inputs of bank of band pass filters 41–46, each dimensioned to pass a narrow band of frequencies.

In operation of the embodiment illustrated in FIG. 5 the signals present on the output of the filters 19 will be as described with reference to FIG. 2. These signals are delayed by the delay units 35, 36, 37, which impart different delays to the signals present on the outputs of each filter 19. Each delay unit is such that the signals are delayed by a period of time which is n units long, where n is the number associated with the aerial 8 connected to that delay unit. The output of each delay line 35, 36, 37, is fed to a modulator 38, 39, 40 which is controlled by the switch wave generator 23. The modulators are rendered conductive sequentially for a period of one unit of time, starting with the modulator 40 (associated with the aerial 8 for which $n = 0$) and proceeding to the other modulators 39, 38, in the order defined by the number n associated with each areial 8. It can be seen that this wil produce wave forms as illustrated in FIG. 4, on the common output of the modulators 38–40, constituting an information signal.

The common output of the modulators 38–40 is fed to a bank of narrow band pass filters 41–46, each adapted to pass one of the possible frequencies of the signal from the modulators. The frequency of the signal from the modulators is dependent upon the angle $\phi$, and thus the presence of a signal on the output of any one filter will indicate a specific value for the angle $\phi$. The outputs of each of the filters 41–46 is fed to the processor 13 of FIG. 1, where the information is processed.

The invention has been described, by way of example, with reference to a position locating arrangement adapted to locate the position of a transmitter which transmits signals in response to command signals. However, it is to be understood that the present invention may be used with benefit in primary radar applications, in which the position of a target which reflects signals transmitted by the locating arrangement is determined. Such a target can be considered as a virtual source of radio frequency radiation. Furthermore, the arrangement can also be used to locate the position of any target which is continually transmitting signals — or transmitting signals at predetermined times. Such targets may well be rockets or like devices fitted with "homing" transmitters to enable their positions to be located.

In describing the invention two specific embodiments have been illustrated and described in detail. However, there are many possible embodiments of the invention that will be envisaged by the man skilled in the art.

In utilising the invention only the signals that are received by the aerials during a predetermined period of time are sampled, and these signals are subtractively mixed with similar signals to produce a signal carrying the phase of the signals received by the aerials. Thus there is no need for the signals received by the aerials to be coherent. Consequently it is not essential to use coherent signal generators, thereby effecting a great financial saving. Furthermore, a position locating arrangement as described could be used to locate the position of the source of a noise-like or randomly frequency shifted signal, as it is only the instantaneous phase of the signal received by each aerial that is actually utilised.

Referring to FIG. 6, this illustrates a modification which may be made to the frequency measuring arrangement 26, 27 illustrated in FIG. 2 in order to increase the precision of the measurement. This modification introduced between frequency generator 16 and mixer 15 in the arrangement of FIG. 2 results in a frequency shift of the signal applied to mixer 15 such that a beat of one cycle occurs over the total measuring time in a given number of scans.

Output from frequency generator 16 is applied to a mixer 47, a second input for which is derived from an oscillator 48 which is controlled to oscillate at the frequency of generator 16 plus $1/T_s.N_s$. Control for oscillator 48 is derived via a narrow band filter 49 from the output of a further mixer 50, which is arranged to mix output from a further oscillator 51, oscillating at a frequency 1/Ts.Ns, and output from a filter 52 centred on the frequency 1/Ts.Ns which derives input from the mixer 47. Ts is the scan time in seconds, whilst Ns is the number of scans over which the beat of one cycle is chosen to extend.

The off-set frequency should not be the same as that of a harmonic of the clock and sampling frequencies, since a constraint to the bearing precision would result. The bearing precision would in fact be limited to $\pm \lambda/2D$, where $\lambda/D$ = array proportions.

As the frequency counter can count only a whole number of cycles, arranging for the phase to progress rythmically over the total measuring time, as described, explores all phases.

By arranging for beat of one cycle in the total measuring time over a number of scans Ns, the precision becomes $\pm \frac{1}{2}.\lambda/D.1/Ns$. For example if $\lambda/D = 2\pi/360$ and $Ns = 20$ the precision is $\pm .025°$.

I claim:

1. A direction finding arrangement for determining the bearing of a point from which radio frequency electromagnetic radiation is received, comprising:

an array of aerial elements for receiving said radiation;

modulator means for simultaneously gating for a predetermined period of time signals derived from the respective aerial elements;

delay means for delaying the gated signals by different amounts to arrange the gated signals sequentially in time whereby to produce an information signal having a frequency representative of the bearing of said point; and means for determining the frequency of said information signal;

said signals derived from each aerial being produced by heterodyning the signals received by each aerial with signals produced by a local oscillator, additively mixing the heterodyned signals received by one aerial with a reference frequency, and subtractively mixing the resultant signal with the heterodyned signals received by each of aerials.

2. In a direction finding system, in combination:

an array of aerial elements disposed individually to receive a wave packet of radio frequency electromagnetic radiation from a distant point at times dependent upon the direction of said point relative to said array;

first means for passing radiation received by all of said aerial elements during a short period of time sufficient for reception of said wave packet by all of said elements and for presenting individual output signals corresponding to the individual elements in which the output signals are of a selected frequency much less than that of the received radiation and of phases dependent upon the relative times of reception of the wave packet at the corresponding aerial elements, and including delay means for presenting said output signals in sequential fashion as an information signal extending over an information period of time which is at least equal to nt where n is the number of said output signals and t is said short period of time; and second means for determining the cyclic content of said information signal during said information period of time;

the cyclic content of said information signal being determined by feeding said signal to a bank of band pass filters having their bands centred on differing frequencies.

3. In a direction finding system, in combination:

an array of aerial elements disposed individually to receive a wave packet of radio frequency electromagnetic radiation from a distant point at times dependent upon the direction of said point relative to said array;

first means for passing radiation received by all of said aerial elements during a short period of time sufficient for reception of said wave packet by all of said elements and for presenting individual output signals corresponding to the individual elements in which the output signals are of a selected frequency much less than that of the received radiation and of phases dependent upon the relative times of reception of the wave packet at the corresponding aerial elements, and including delay for presenting said output signals in sequential fashion as an information signal extending over an information period of time which is at least equal to nt where $n$ is the number of said output signals and $t$ is said short period of time; and second means for determining the cyclic content of said information signal during said information period of time;

and including means for off-setting each information period of time in a number of sequential scan periods of time such that a beat of one cycle is obtained over the period of time occupied by that number of sequential scan periods of time.

4. In a direction finding system, in combination:

an array of aerial elements disposed individually to receive a wave packet of radio frequency electromagnetic radiation from a distant point at times dependent upon the direction of said point relative to said array;

first means for periodically passing radiation received by all of said aerial elements only during a short period of time covering many cycles of said radiation sufficient for reception of said wave packet by all of said elements and for presenting individual but overlapping output signals corresponding to the individual elements in which the output signals are of a selected frequency much less than that of the received radiation and of phases dependent upon the relative times of reception of the wave packet at the corresponding aerial elements, and including delay means for delaying said overlapping output signals by different multiples of a delay time at least equal to said short period of time so as to present said output signals in sequential fashion as an information signal extending over an information period of time which is at least equal to nt where n is the number of said output signals and $t$ is said short period of time; and second means for determining the number of zero crossings of said information signal within said information period of time and for determining the time lapse between the first and the last zero crossings within said information period of time.

5. An arrangement as claimed in claim 4 and wherein the frequency of said information signal is determined by a zero-crossing counter and a device measuring the time between the first and last zero-crossings of the signal.

* * * * *